C. B. O'NEILL.
DEVICE FOR CLEANING WIND SHIELDS.
APPLICATION FILED JULY 31, 1919.
1,325,903.
Patented Dec. 23, 1919.
2 SHEETS—SHEET 1.
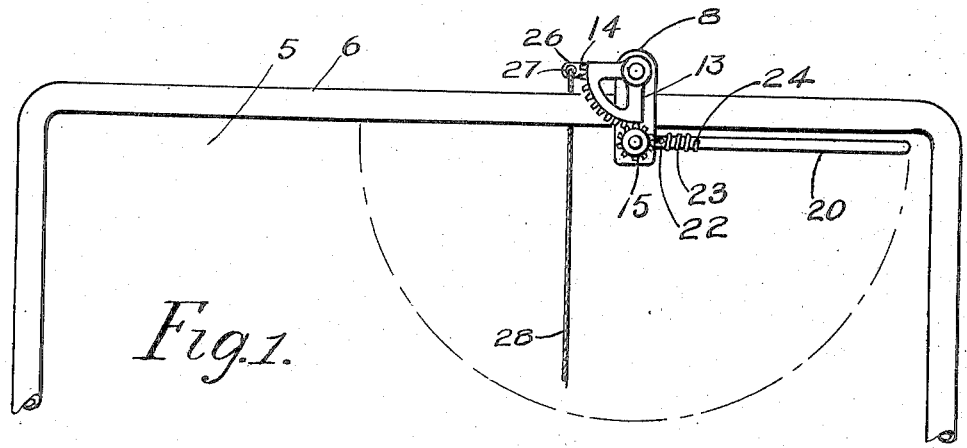
Fig. 1.
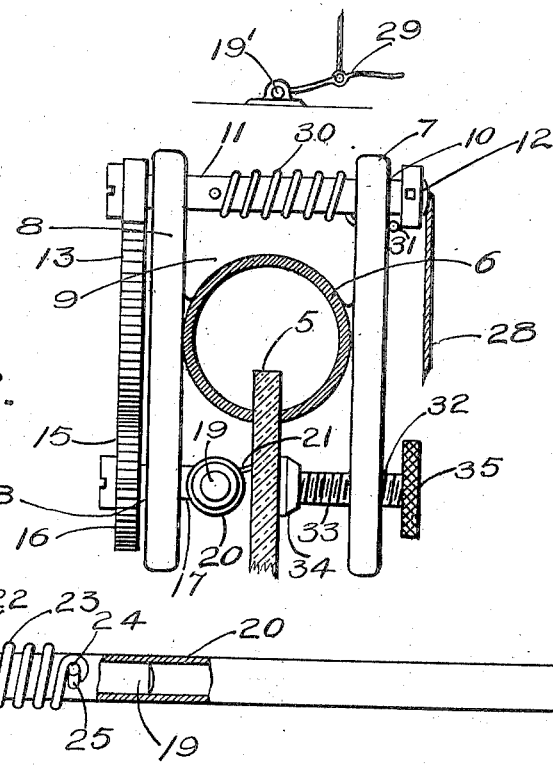
Fig. 2.
Fig. 3.
C. B. O'Neill.
Inventor
Witness C. B. O'NEILL.
DEVICE FOR CLEANING WIND SHIELDS.
APPLICATION FILED JULY 31, 1919.
1,325,903.
Patented Dec. 23, 1919.
2 SHEETS—SHEET 2.
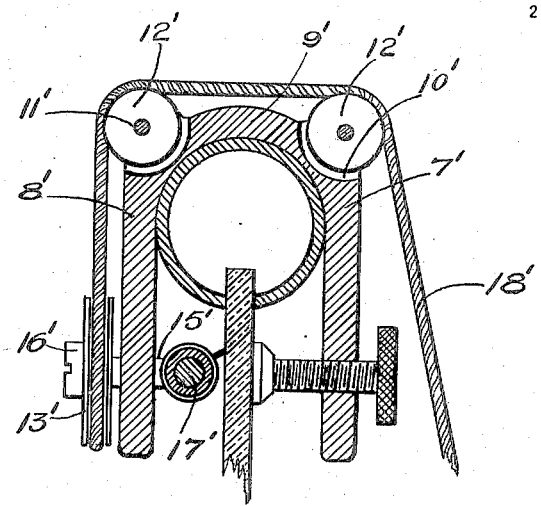
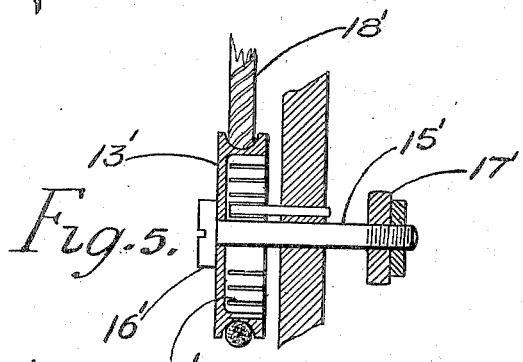
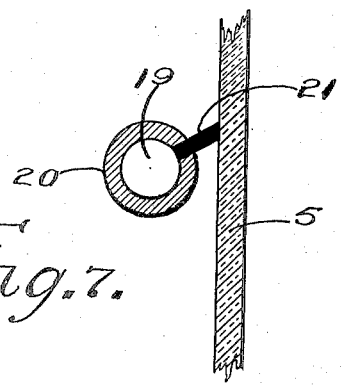
C. B. O'Neill.
Inventor
Witness
By C. A. Snow & Co.
Attorneys

UNITED STATES PATENT OFFICE.

CLARENCE B. O'NEILL, OF CLYMER, PENNSYLVANIA.

DEVICE FOR CLEANING WIND-SHIELDS.

1,325,903.　　　　　　Specification of Letters Patent.　　Patented Dec. 23, 1919.

Application filed July 31, 1919. Serial No. 314,419.

*To all whom it may concern:*

Be it known that I, CLARENCE B. O'NEILL, a citizen of the United States, residing at Clymer, in the county of Indiana and State of Pennsylvania, have invented a new and useful Device for Cleaning Wind-Shields, of which the following is a specification.

This invention relates to improvements in an automobile wind shield attachment, and more particularly to devices for cleaning or wiping the wind shield free of snow, rain or other foreign matter, to enable the operator to have an unobstructed view through the wind shield, at all times.

A further object of the invention is to provide a device of this character which may be readily and easily attached to any type of wind shield, now in use.

A still further object of the invention is to provide means operated by the foot of the operator for operating the wiping element of the cleaner.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a side elevational view of a wind shield having my invention attached thereto.

Fig. 2 is a sectional view of the same.

Fig. 3 is a detail view disclosing the means of connecting the wiping element to its shaft.

Fig. 4 is a sectional view of a modified form of wiper operating means.

Fig. 5 is a sectional view of the spring pulley used for returning the wiper.

Fig. 6 is a side elevational view of the spring pulley, and;

Fig. 7 is a sectional view of the wiping element, disclosing the manner in which the same engages the wind shield.

Referring now to the drawings in detail, the reference character 5 indicates the glass wind shield, to which my invention is applied, the wind shield including the usual metallic frame 6, which is supported on the body of the automobile, adjacent the rear of the engine hood, not shown.

Having reference to Sheet 1 of the drawings, which discloses my preferred form, the reference character 7 indicates one of the side members of the bracket which supports the cleaner in proper relation with the wind shield, and the reference character 8 indicates the opposite side member of the bracket, the side members 7 and 8 being connected by the curved integral arched member 9, which as shown is curved to conform to the curvature of the upper edge of the metallic frame 6.

The upper ends of each of the side members of the bracket are provided with transverse openings 10, forming bearings for the operating shaft 11, which has its ends positioned in said openings 10, in such a way that portions thereof extend beyond the vertical plane of the side members 7 and 8, for purposes to be hereinafter more fully described.

On the end 12 of the shaft 11, is rigidly mounted the segmental rack 13, the teeth 14 thereof being in mesh with the teeth 15 of the pinion 16 mounted on the shaft 17, which shaft extends through the opening 18 provided in the lower end of the side member 8 of the bracket.

As shown, the shaft 17 extends beyond the vertical plane of the inner side wall of the side member 8, and has an integral right angled arm 19 formed thereon, which arm engages within the tubular member 20 forming the support for the rubber wiping element 21, which operates over the wind shield glass for cleaning the same of any foreign matter which may become deposited thereon.

This tubular element 20 is provided with an upwardly extending leg 22 around which is coiled one end of the coil spring 23, the opposite end of said coil spring 23 having connection with the lug 24 formed on the shaft 19, and which operates in the slot 25, for exerting pressure on the tubular member 20, in one direction, for forcing the wiping element 21 into close engagement with the wind shield glass 5.

The end 12 of the operating shaft 11 has connection with the laterally extending arm 26, which arm 26 is provided with an opening 27 to receive the upper end of the flexible connection 28, which has its lower end connected to the lever 29 to be engaged by the operator's foot, for drawing the arm 27 downwardly and consequently causing a sweeping movement of the cleaning element 21.

As shown, the coil spring 30 has one of its ends secured to the operating shaft 11, the intermediate portion thereof being coiled around said shaft 11, the opposite end of said coil spring 30, being secured to a side member 7 of the bracket, as at 31, whereby the operating shaft 11 is returned to its normal position as shown by Fig. 1, when the foot pedal 29 has been released.

Adjacent the lower end of the side member 7, is a threaded opening 32, through which operates the threaded shaft 33, of the clamping member 34, the same being forced into engagement with the wind shield glass 5, by merely rotating the head 35 of the threaded shaft 33. It will thus be seen that the bracket member is rigidly, but detachably connected to the wind shield.

In the modified form of the invention, shown more particularly by Sheet 2 of the drawings, I have provided a bracket member including the side members 7' and 8', connected at their upper ends by the arched member 9', and having suitable supporting ears 10' formed on the side members 7' and 8', for supporting the shaft members 11', which in turn support the pulley members 12'.

In this form, I have employed a spring pulley 13', having the internal coiled spring 14' supported therein in such a way that the same will impart rotary movement to the pulley, in one direction, or in a direction to return the pulley to its normal inoperative position.

The shaft 15' extends through the side member 8' of the bracket and has connection with the pulley 13' by means of the nut 16', which secures the pulley and shaft together, in such a way that rotary movement of the pulley 13' causes a relative movement of the shaft 15'. The shaft 15' is provided with a right angled portion 17', which is of a construction as indicated by Fig. 3 of the drawings, and as previously described, carries the wiping element 21.

Adjacent the lower end of the side member 7' is a clamping element the same as shown by Fig. 2 of the drawings, and as previously described, therefore it will be unnecessary to go into details with regard to the construction of this clamping element.

A flexible member 18' has one of its ends connected with the pulley 13', the intermediate portion thereof passing over the pulleys 12', and the opposite end of said flexible member having connection with the usual foot pedal 29, pivoted to the floor of the automobile, as at 19'.

The operation of the device is as follows. When a machine is running along through rain, the rain collects on the wind shield, in such a way that the view of the operator is obstructed, thereby increasing the chances of having an accident.

When the wind shield is in such condition, it is only necessary for the operator to place his foot on the pedal 29, depressing the same, with the result that the segmental gear 14 operates the pinion 15, which in turn operates the wiping element 21 in such a way that the same sweeps the outer surface of the wind shield, thereby removing all foreign matter collected thereon, and the operator now has a clear unobstructed view through the wind shield.

The same operation takes place in the form shown by Fig. 4 of the drawings, with the exception that the spring pulley 13' operates the wiping element 21, instead of the segmental rack 14 and pinion 15.

Having thus described my invention, what I claim is:—

1. In a device of the character described, a bracket including spaced side members, said side members extending downwardly and overlying the wind shield, a curved member connecting the side members and embracing the upper edge of the wind shield, a shaft extending through one of the side members adjacent the lower edge thereof, a wiping element carried by one end of the shaft, means for exerting pressure on the wiping element, an adjustable threaded clamping member extending through the opposite side member and engaging the wind shield for coöperating with the wiping element for positively securing the bracket to the wind shield against lateral movement, and means for operating the wiping element.

2. In a device of the character described, a bracket including spaced side members, said bracket adapted to embrace the portion of a wind shield, a rotary operating shaft positioned within the bracket, a coiled spring positioned on said shaft for moving the shaft in one direction, a wiping element, a shaft connecting the wiping element to one of the side members of the bracket, means for providing communication between the shaft and wiping element, to provide a rotary motion of the wiping element, and means for operating the operating shaft.

In testimony that I claim the foregoing as my own, I have hereto affixed my signature in the presence of two witnesses.

CLARENCE B. O'NEILL.

Witnesses:
IRWIN C. SMITH,
HARRY M. FRYCKLUND.